(12) United States Patent
Kim et al.

(10) Patent No.: US 8,649,334 B2
(45) Date of Patent: *Feb. 11, 2014

(54) RADIO RESOURCE REALLOCATING METHOD FOR CIRCUIT MODE

(75) Inventors: Sung Kyung Kim, Daejeon (KR); Sung Cheol Chang, Daejeon (KR); Kwang Jae Lim, Daejeon (KR); Chul Sik Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

This patent is subject to a terminal disclaimer.

(21) Appl. No.: 12/522,682

(22) PCT Filed: May 30, 2008

(86) PCT No.: PCT/KR2008/003071
§ 371 (c)(1),
(2), (4) Date: Jul. 9, 2009

(87) PCT Pub. No.: WO2008/147150
PCT Pub. Date: Dec. 4, 2008

(65) Prior Publication Data
US 2010/0020758 A1    Jan. 28, 2010

(30) Foreign Application Priority Data

May 30, 2007  (KR) ........................ 10-2007-0052546
Mar. 13, 2008  (KR) ........................ 10-2008-0023502

(51) Int. Cl.
*H04W 72/04*  (2009.01)
*H04W 16/00*  (2009.01)
*H04W 4/00*   (2009.01)

(52) U.S. Cl.
USPC ........................................ 370/329

(58) Field of Classification Search
USPC ........................................ 370/329
See application file for complete search history.

(56) References Cited

U.S. PATENT DOCUMENTS 6,466,544 B1  10/2002  Sen et al.
7,573,851 B2   8/2009  Xing et al.
(Continued)

FOREIGN PATENT DOCUMENTS

CN  1719930 A  1/2006
CN  1905754 A  1/2007
(Continued)

OTHER PUBLICATIONS

Yair Bourlas et al., Persistent Allocation, IEEE 802.16 Broadband Wireless Access Working Group, Mar. 17, 2008.

(Continued)

*Primary Examiner* — Derrick Ferris
*Assistant Examiner* — Faisal Choudhury
(74) *Attorney, Agent, or Firm* — Jefferson IP Law, LLP

(57) ABSTRACT

The present invention relates to a radio resource reallocation method based on the circuit mode. In order to efficiently use the radio resource in the packet-based data transmission system, a circuit mode radio resource is reallocated based on a rearrangement information element and a rearrangement counter information element by using the circuit mode. Accordingly, an unused region of the discontinuous radio resource that can be generated by resource de-allocation and resource change can be eliminated, and a resource allocation mismatch that can be generated by a MAP receiving error can be solved.

10 Claims, 6 Drawing Sheets

(56) References Cited

U.S. PATENT DOCUMENTS

| | | | |
|---|---|---|---|
| 7,639,663 B1* | 12/2009 | Nerses et al. | 370/347 |
| 7,796,636 B2 | 9/2010 | Tsudaka | |
| 7,912,081 B2 | 3/2011 | Heidari-Bateni et al. | |
| 7,970,906 B2* | 6/2011 | Oh et al. | 709/226 |
| 2002/0051439 A1* | 5/2002 | Kitade et al. | 370/337 |
| 2003/0095538 A1* | 5/2003 | Kayama et al. | 370/350 |
| 2003/0123425 A1* | 7/2003 | Walton et al. | 370/341 |
| 2004/0114563 A1* | 6/2004 | Shvodian | 370/347 |
| 2004/0137907 A1 | 7/2004 | Kim | |
| 2004/0219926 A1* | 11/2004 | Kim et al. | 455/452.2 |
| 2005/0063324 A1* | 3/2005 | O'Neill et al. | 370/310 |
| 2005/0201325 A1* | 9/2005 | Kang et al. | 370/328 |
| 2005/0249114 A1 | 11/2005 | Mangin et al. | |
| 2006/0007849 A1 | 1/2006 | Kim et al. | |
| 2006/0165200 A1* | 7/2006 | Wagner et al. | 375/354 |
| 2007/0019668 A1 | 1/2007 | Lee | |
| 2007/0049283 A1 | 3/2007 | Kim et al. | |
| 2007/0086474 A1* | 4/2007 | Lee et al. | 370/447 |
| 2007/0168577 A1* | 7/2007 | Kim et al. | 710/15 |
| 2007/0189197 A1* | 8/2007 | Kwon et al. | 370/319 |
| 2007/0198723 A1* | 8/2007 | An et al. | 709/226 |
| 2007/0253367 A1* | 11/2007 | Dang et al. | 370/329 |
| 2007/0286127 A1* | 12/2007 | Inohiza | 370/331 |
| 2008/0059625 A1* | 3/2008 | Barnett et al. | 709/223 |
| 2008/0151812 A1* | 6/2008 | Camp et al. | 370/320 |
| 2009/0022098 A1* | 1/2009 | Novak et al. | 370/329 |
| 2009/0075667 A1* | 3/2009 | Bourlas | 455/452.1 |
| 2009/0103487 A1* | 4/2009 | Oh et al. | 370/329 |
| 2009/0252112 A1* | 10/2009 | Shimomura et al. | 370/330 |
| 2010/0046413 A1* | 2/2010 | Jin et al. | 370/315 |

FOREIGN PATENT DOCUMENTS

| | | |
|---|---|---|
| EP | 1 662 823 A1 | 5/2006 |
| JP | 2006-295397 A | 10/2006 |
| KR | 10-1999-0084804 A | 12/1999 |
| WO | 2006/062994 A2 | 6/2006 |
| WO | 2006/115673 A1 | 11/2006 |

OTHER PUBLICATIONS

LAN/MAN Standards Committee, IEEE Std 802.16eTM-2005 and IEEE Std 802.16TM-2004/Cor1-2005, Feb. 28, 2006, pp. 1-6.

* cited by examiner

RADIO RESOURCE REALLOCATING METHOD FOR CIRCUIT MODE

TECHNICAL FIELD

The present invention relates to a radio resource reallocation method, and more particularly, it relates to a method for reallocating radio resource based on a circuit mode.

BACKGROUND ART

In general, a packet based data transmission system, for example, a portable Internet system (WiMAX/WiBro: World Interoperability for Microwave Access/Wireless Broadband) or a wideband wireless access (BWA: Broadband Wireless Access), transmits data by applying a data transmission method using a dynamic resource allocation method so as to efficiently use radio resources. That is, the packet based data transmission system dynamically allocates resources to mobile stations through packet scheduling per frame.

In this instance, a control message, called a MAP, is used so as to broadcast resource allocation information to the mobile station for each frame. The MAP includes user information, a physical allocation of a burst, and a modulation and coding scheme (MCS) of the burst, which are transmitted from the corresponding frame.

Also, the portable Internet system has defined the scheduling classes, such as the unsolicited grant service (UGS), extended real-time polling service (ertPS), real-time polling service (rtPS), non real-time polling service (nrtPS), and best effort service (BE), for the purpose of achieving efficient uplink scheduling. The UGS and the ertPS are suitable for a periodical data service of a relatively less amount or a fixed amount of data, and are widely used since they are advantageous for the utilization of radio resources when traffic in a data service has periodicity such as the Voice Over Internet Protocol (VoIP) and a source rate of the traffic in the data service is variable.

However, the packet based dynamic resource allocation method generates a large amount of MAP overhead so as to support the traffic having the characteristic of the VoIP. Accordingly, the broadband wireless access system considers the circuit mode.

The circuit mode periodically allocates the resource of a fixed region to a specific user in a dedicated manner, and when the resource is allocated to the user, the mobile station has a usage right on the resource until a de-allocation occurs. In this instance, the MCS is also fixed so as to reduce the MAP overhead.

However, when the radio channel state is greatly changed, the above-noted resource allocation method is weak in relation to wireless transmission errors or reduces radio resource utilization, and it is therefore required to change the MCS. However, when the radio resource is de-allocated or the resource is changed according to the change of MCS, a region in which the radio resource is not used discontinuously may be generated.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a method for eliminating a region in which the discontinuous radio resource is not used that may be generated by resource de-allocation and resource change.

Technical Solution

The present invention has been made in another effort to provide a radio resource allocation method for solving a resource allocation mismatch that may occur when an error occurs during receiving the MAP.

In one aspect of the present invention, a method for a base station to reallocate a resource includes: generating a rearrangement information element including slot offset information and slot shift information of a fixed radio resource to be rearranged; transmitting the rearrangement information element to a mobile station; and shifting a slot of the fixed radio resource by the slot shift information to reallocate a resource to the mobile station.

In another aspect of the present invention, a method for a mobile station to receive a resource from a base station includes: receiving a MAP including a rearrangement information element including a first slot offset for indicating information on a fixed radio resource to be rearranged; comparing the first slot offset and a second slot offset that corresponds to the resource that is currently in use; and receiving and using a new fixed radio resource or using the resource that is currently in use depending on the comparison result.

In another aspect of the present invention, a method for a base station to reallocate a resource includes: generating a rearrangement information element including information on a fixed radio resource to be rearranged; increasing a rearrangement counter when the rearrangement information element is generated; and transmitting a MAP including a rearrangement counter information element including the rearrangement counter.

In another aspect of the present invention, a method for a mobile station to receive a resource from a base station includes: receiving a MAP including a rearrangement counter information element from the base station; and receiving a new fixed radio resource based on the rearrangement counter value included in the rearrangement counter information element.

Advantageous Effects

An unused region of the discontinuous radio resource that can be generated by resource de-allocation and resource change can be eliminated, and a resource allocation mismatch that can be generated by a MAP receiving error can be solved.

BEST MODE

Figure 1:
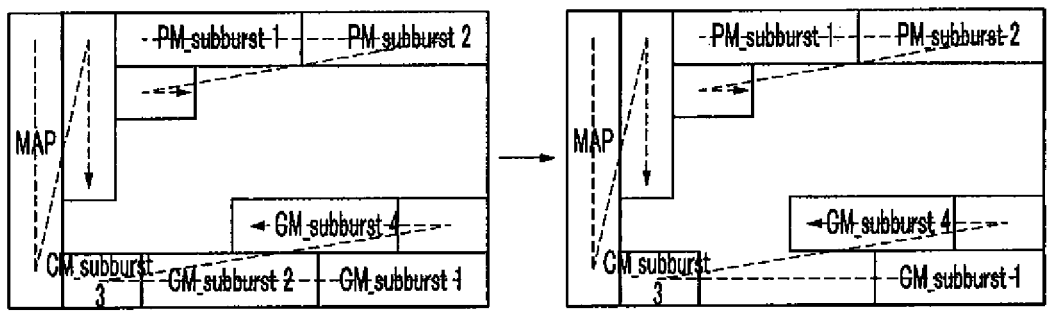
FIG. 1 shows general de-allocation of a circuit resource.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

FIG. 1 shows general de-allocation of a circuit resource.

In general, when a resource is allocated according to the circuit mode (CM), the map overhead is reduced compared to the case of the packet transmission method, but reallocation and de-allocation for changing the MCS is randomly generated. Therefore, the circuit region and the de-allocated radio resource region may be mixed discontinuously. Here, the MAP includes information elements (IE) for allocating the radio resource or for radio control in the downlink and uplink frames.

The packet transmission method based on the packet mode (PM) and the circuit mode may be mixed in the communication system. In this instance, as shown in FIG. 1, a MAP is allocated at the beginning of a frame. In order to maintain compatibility with the existing packet transmission method and efficiently use the resources, the packet mode resources (PM_subburst 1, PM_subburst 2) are sequentially allocated in the order from the front to the rear, and the circuit mode resources (CM_subburst 1, BM_subburst 2, BM_subburst 3, BM_subburst 4) are sequentially allocated in the order from the rear to the front.

Figure 4:
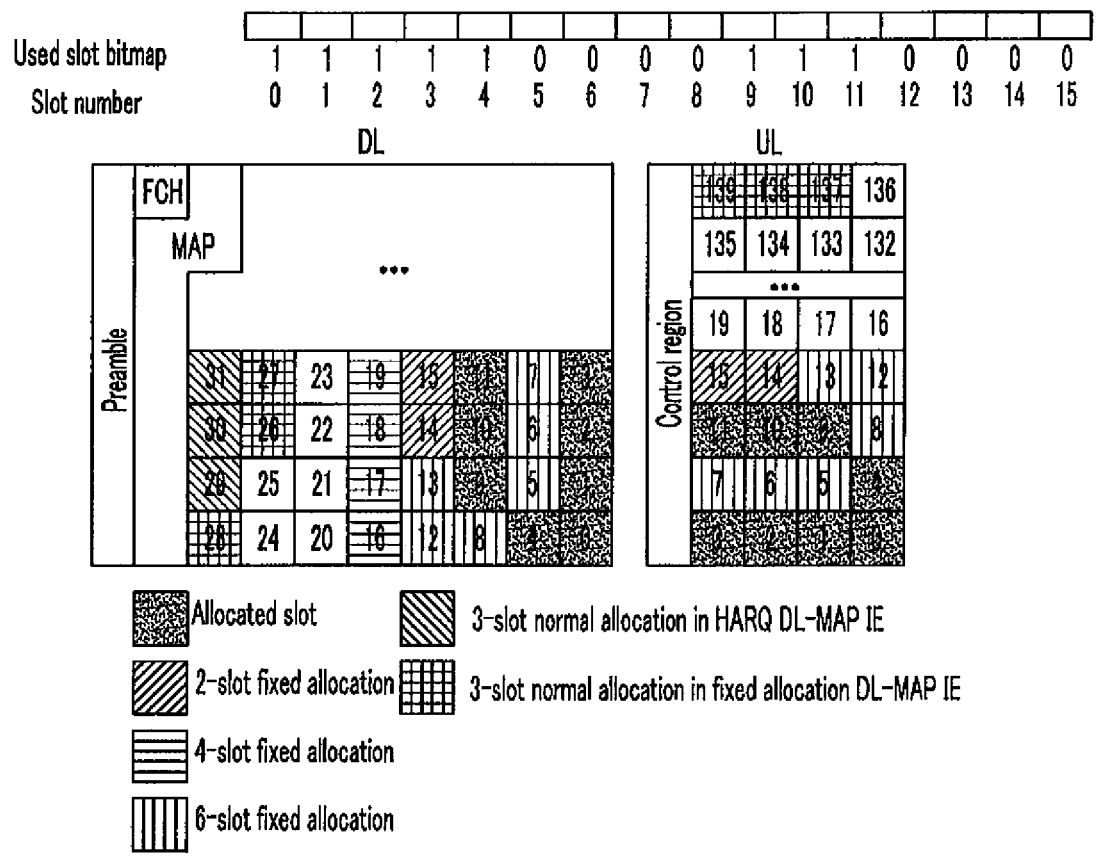
FIG. 4 shows a circuit mode according to a general bit map.

That is, FIG. 1 is an exemplary embodiment in which the circuit mode resource and the packet mode resource are mixed showing that a resource region for the resource of the packet mode and a resource region for the resource of the circuit mode can be allocated and operated in one frame in advance. Also, it is possible to allocate the resource of the circuit mode and the resource of the packet mode on the frequency axis in advance in the downlink and then allocate the resources on the time axis as shown in FIG. 4. In this instance, when the burst 2 (CM_subburst 2) is de-allocated in the circuit region, a resource unused region (or a hole region) is generated as shown in FIG. 1.

Figure 2:
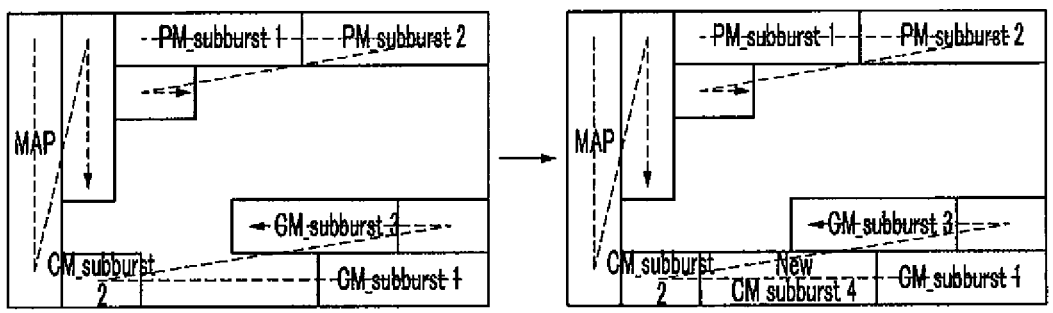
FIG. 2 shows a method for using a de-allocation resource by using a general new burst allocation.

Here, when a new allocation request according to a circuit mode is generated, a hole region of the resource can be newly allocated so as to reuse the hole region, which is shown in FIG. 2.

FIG. 2 shows a method for using a de-allocation resource by using a general new burst allocation.

As shown in FIG. 2, a resource (New CM_subburst 4) can be newly allocated to the hole region so as to reuse the hole region. In this instance, when the size of the circuit is constant, it is advantageous to reuse the hole region. However, since the mobile station's MCS level and the required amount of the resource can be different, the probability in which the new allocation request amounts at the region in which the hole is generated and at the time the resource allocation is requested are the same is relatively low.

Another method for reusing the hole region is the multiple region allocation method for allocating a plurality of discontinuous holes when a new allocation request according to a circuit mode is generated, which will be described with reference to FIG. 3.

Figure 3:
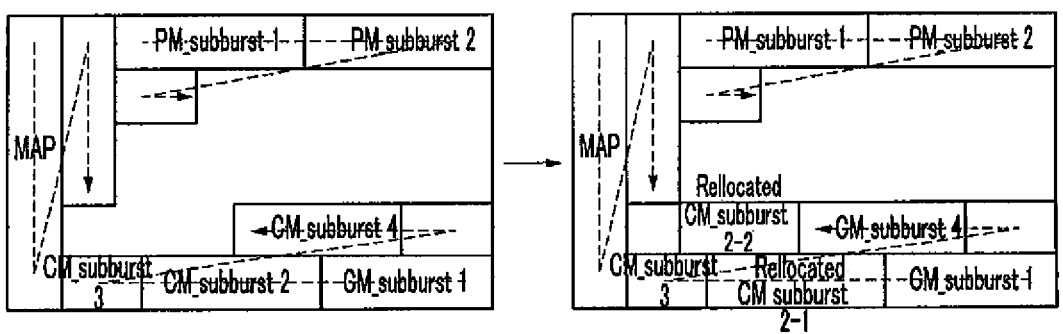
FIG. 3 shows a method for using a de-allocation resource by using a multiple region allocation method.

FIG. 3 shows a method for using a de-allocation resource by using a multiple region allocation method.

As shown in FIG. 3, a newly allocated resource can be divided and allocated to the hole region (Reallocated CM_subburst 2-1) from which the existing resource (CM_burst 2) is de-allocated and a new region (Reallocated CM_subburst 2-2). When a coded burst is transmitted in a plurality of radio regions, the mobile station receives the radio regions to decode the same. However, a MAP overhead for expressing many regions is generated. Also, during the radio region allocation and the MCS change/de-allocation process, a plurality of fragments are generated to increase the MAP size and thus increase the MAP overhead.

A bit map method is proposed so as to efficiently use the hole of the discontinuous resource caused by the MCS de-allocation and MCS reallocation. The circuit mode according to the bit map method will now be described with reference to FIG. 4.

FIG. 4 shows a circuit mode according to a general bit map.

The numbers of the slots shown in FIG. 4 indicate the order of allocating the resources, and hence, the resources are allocated according to the order shown in FIG. 4. The circuit mode according to the bit map can indicate whether the radio resource region is in use or not. That is, when a resource allocation according to the circuit mode is generated or changed, the mobile station can detect the position of the resource to be used by the mobile station by reading the bit map. When the hole of the resource is generated, the bit map method can efficiently allocate the resource since it can know where the hole is generated.

However, when a resource allocation is changed, the overhead is generated by the bit map since it is required to always transmit the bit map to the mobile station. Further, when the bit map is compressed by the method such as the Huffman coding and is then transmitted, and the resource allocation is frequently changed, the MAP size is increased because of the overhead caused by the bit map, and hence, the complexity for realizing the system is increased.

Since the overhead is generated when the hole of the radio resource that is generated by resource de-allocation or MCS change is reallocated to other users during using the circuit mode, a resource rearrangement method for eliminating the hole of the radio section according to an exemplary embodiment of the present invention will be proposed, which will now be described with reference to FIG. 5 and FIG. 6.

Figure 5:
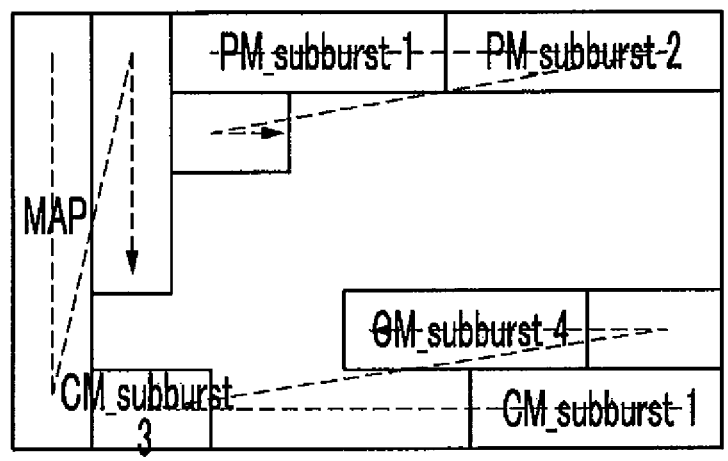
FIG. 5 and FIG. 6 show a method for rearranging a resource by a base station according to a first exemplary embodiment of the present invention.
Figure 6:
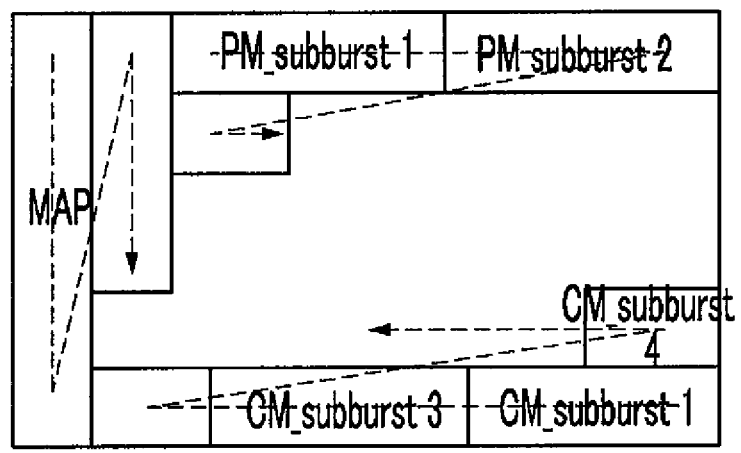

FIG. 5 and FIG. 6 show a method for rearranging a resource by a base station according to a first exemplary embodiment of the present invention. FIG. 5 and FIG. 6 show the case of allocating the resource on the time (symbol) axis in advance when allocating the resource in the first dimension, and can be applicable to the case of allocating the resource on the frequency (subchannel) axis in a like manner.

In order to eliminate the hole of the radio resource in the first exemplary embodiment of the present invention, a MAP including a rearrangement information element (IE) will be used. The MAP including a rearrangement information element is controlled to be less than the MAP that is transmitted to the mobile station when allocating the resource according to the dynamic allocation method, and it has no overhead on the bitmap transmission that is required when using the bit-map method. Therefore, utilization of the resource can be improved by eliminating the hole of the radio resource.

As shown in FIG. 5, it is assumed that the circuit mode sub burst 1 to the circuit mode sub burst 4 (CM_subburst 1-CM_subburst 4) are allocated to be used by the mobile station in the previous frame and the circuit mode sub burst 2 (CM_subburst 2) is de-allocated. As shown in FIG. 6, the hole of the radio resource is eliminated in the current frame by rearranging the circuit mode sub burst 3 (CM_subburst 3) into the region of the circuit mode sub burst 2 (CM_subburst 2) and rearranging the circuit mode sub burst 4 (CM_subburst 4) into the region of the circuit mode sub burst 3 (CM_subburst 3). Here, the arrow direction indicates the order of allocating the resource.

That is, when a hole is generated by the radio resource (when the resource allocated to the circuit mode sub burst 2 (CM_subburst 2) is de-allocated as shown in FIG. 5), the base station includes corresponding information in the rearrangement information element and transmits the information to the mobile station, and shifts the circuit sub burst 3 (CM_subburst 3) and the circuit sub burst 4 (CM_subburst 4) by the information shown in a slot shift field so as to be consecutive to the circuit mode sub burst 1 (CM_subburst 1).

A resource rearrangement method by eliminating the hole of the radio resource will now be described with reference to FIG. 7.

Figure 7:
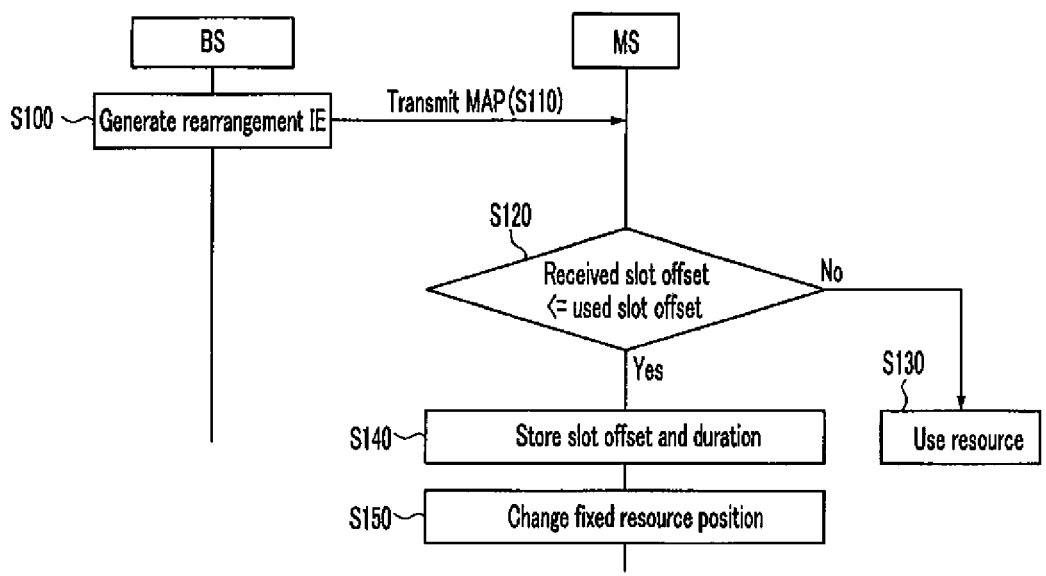
FIG. 7 is a flowchart for a resource rearrangement method according to a first exemplary embodiment of the present invention.

FIG. 7 is a flowchart for a resource rearrangement method according to a first exemplary embodiment of the present invention.

As shown in FIG. 7, the base station rearranges the radio resource by using the MAP information given in Table 1 to Table 3. In this instance, the fields of Table 1 to Table 3 exemplify a fixed sub burst IE, a rearrangement IE, and a rearrangement counter IE that are included in a MAP and transmitted to the mobile station.

TABLE 1

| Syntax | Size | Notes |
|---|---|---|
| Fixed-sub burst IE { | | |
| N subburst | 4 bits | |
| ... | | |
| Slot start offset | 10 bits | |
| For (j=0; j<Nsubburst; j++) { | | |
| RCID IE | V | |
| Period | 4 bits | |
| Duration | 10 bits | |
| DIUC | 4 bits | |
| ... | | |
| } | | |
| Padding | | |
| } | | |

TABLE 2

| Syntax | Size | Notes |
|---|---|---|
| Rearrangement IE { | | |
| N Rearrangement | 4 bits | |
| ... | | |
| Rearrangement counter | 4 bits | |
| For (j=0; j<Rearrangement; j++) { | | |
| Slot offset | 8 bits | Start offset |
| Slot shift | 8 bits | Bit 0: It indicates the direction of shift. (0: positive shift, 1: negative shift) Bits 1-7: It indicates the amount of shift in slot |
| } | | |
| Padding | | |
| } | | |

TABLE 3

| Syntax | Size | Notes |
|---|---|---|
| Rearrangement counter IE { | | |
| Type | 4 bits | DIUC |
| Extended Type | 4 bits | Extended-2 DIUC |
| Rearrangement counter | 4 bits | |
| } | | |

As given in Table 1, the fixed sub burst IE includes a sub burst number (N subburst) field, a slot start offset field, and an information field for the sub bursts. The information on the sub bursts includes a period field for indicating an allocation period on the resource allocation according to the circuit mode, a reduced CID (RCID) information element field for indicating connection identifier (CID) information, a duration field for indicating the number of allocated slots, and a downlink interval usage code (DIUC) field for indicating MCS information of a downlink interval.

As shown in Table 2, the rearrangement information element includes an N rearrangement field for the base station to rearrange the resource, a rearrangement counter field, and a rearrangement information field. In this instance, since the rearrangement is generated by the number of hole regions, the number N of rearrangements corresponds to the number of hole regions. The information field of the rearrangement includes a first slot offset field and a slot shift field for indicating a resource shift. Slot shift is bidirectional. The 1 MSB in the slot shift filed indicates the direction of the slot shift and the other 7 bits including LSB in the slot shift field indicate the amount of shift. If the MSB of the slot shift field is zero (that is, if a radio resource is not allocated), the direction of the slot shift is positive in order to fill in a hole region of a resource. If the MSB of the slot shift field is "1", the slot shift can be performed in the direction of extending the hole region. This may be used for allocating a new resource to an extended hole region and changing the size of the existing allocated resource.

Here, the first slot offset is slot offset information provided to the mobile station through the rearrangement information element, representing information (a start point of a fixed radio resource after a discontinuous region) on an end point of the discontinuous region of the fixed radio resource and information (or rearrangement resource information) on the resource (CM_subburst 3) that is initially rearranged from among the resources to be rearranged. Referring to FIG. 5, the first slot offset field represents the start point position of the circuit mode sub burst 3 (CM_subburst 3). As shown in Table 2, the information element of "8+20*N bits" is required according to the number N of holes for the rearrangement information element. However, the number of rearrangement information elements is not restricted thereto.

The rearrangement counter information element of Table 3 includes a DIUC type field, an extended DIUC type field, and a rearrangement counter field. The rearrangement counter is increased by 1 when a rearrangement occurs in the resource. That is, referring to FIG. 5 and FIG. 6, the count is increased by 1 since a hole is generated in the circuit mode sub burst 2 (CM_subburst 2) region and a resource rearrangement is required. It is because the mobile stations to which the circuit mode sub burst 3 (CM_subburst 3) and the circuit mode sub burst 4 (CM_subburst 4) are allocated based on the slot offset field and the shift slot field of Table 2 rearrange the resource.

When a hole region is generated and the resource is rearranged, the base station generates the rearrangement information element of Table 2 according to the hole region S100, includes the generated rearrangement information element into the MAP, and broadcasts the rearrangement information element to the mobile station S110. The mobile station compares the duration and the second slot offset that is stored in the circuit mode burst that is allocated through the circuit mode and is currently used and compares the first slot offset and the second slot offset that is currently in use S120. Here, the second slot offset indicates information on the slot offset that is currently in use.

For example, referring to FIG. 5, FIG. 6, and Table 2, the slot offset field of the rearrangement information element includes rearrangement resource information (sub burst 3), and the shift slot field includes information on the size of the sub burst 2. The base station inputs rearrangement resource information into the rearrangement information element through the first slot offset and broadcasts the same to the mobile station.

When the second slot offset is less than the received first slot offset, the currently used second slot offset and the duration are stored, when the allocation period denoted in the period field of Table 1 comes, the resource is used at the designated position S130. That is, in the case of the mobile station that receives the circuit mode sub burst 1 (CM_subburst 1) and uses the resource, the first slot offset is the sub burst 3, the second slot offset is the sub burst 1, and the second slot offset is less than the first slot offset. In this case, the mobile station consecutively uses the resource allocated to the mobile station.

However, when the first offset is less than or equal to the second offset, the mobile station stores the received first slot offset and the duration S140, and changes the position of the fixed radio resource S150. That is, since the second slot offset is greater than or equal to the first slot offset in the case of the mobile stations that receive the circuit mode sub burst 3 (CM_subburst 3) and the circuit mode sub burst 4 (CM_subburst 4) and use the resource, the mobile stations change the fixed radio resource by referring to the shift slot field.

When the resource is rearranged by using the circuit mode, the mobile station may erroneously receive the MAP, and when a rearrangement occurs, the mobile station failing to receive the MAP may influence another circuit mode user. Therefore, the radio resource will be rearranged through the rearrangement counter method and the multiple IE transmission method in the second exemplary embodiment of the present invention.

In the rearrangement counter method, the base station loads the rearrangement counter information element on the MAP and broadcasts it once, receives a message including a MAP receiving state and a rearrangement counter matched state from a plurality of mobile stations having received the MAP, and rearranges the resource. In this instance, when the MAP has no rearrangement counter, it is determined that the resource is not rearranged, and the mobile station continuously uses the resource. That is, the mobile station continuously uses the circuit mode resource when the next frame includes no rearrangement counter after failing to receive a MAP in the previous frame or when a counter having the same value as the stored rearrangement counter is transmitted.

The radio resource is rearranged through the rearrangement counter in order to guarantee synchronization of circuit mode burst rearrangement and restore the same when the mobile station operable by the circuit mode erroneously receives the MAP. The rearrangement counter is used to indicate the case in which the circuit mode position of the mobile station is changed, and it is applied to the frame to which the rearrangement information element is applied, and the counter is increased when a circuit burst is rearranged or when the allocation and the de-allocation are simultaneously performed in the same region.

The rearrangement counter is broadcasted as the information element through the MAP until it is determined whether the mobile station, which is allocated the reallocated resource by the base station, transmits and receives the frames starting from the frame to which the rearrangement information element is applied or until a time out (MAX_RE_AR-RANGE_TIMEOUT) for the arrangement is generated. Here, transmitting/receiving is determined by one of the hybrid automatic repeat request (HARQ) feedback, the uplink burst, and the channel quality indicator channel (CQICH), which will be described with reference to FIG. 8.

Figure 8:
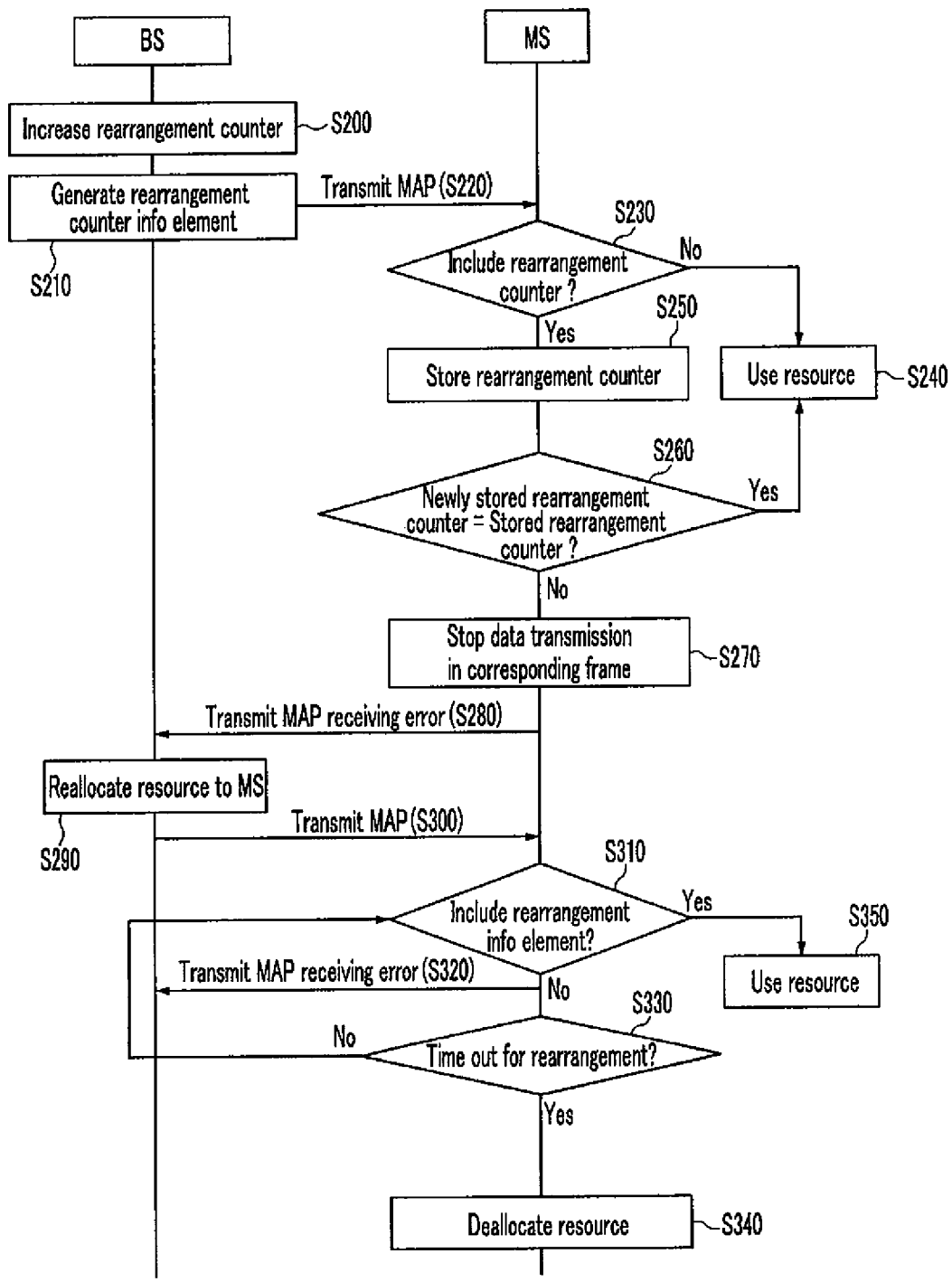
FIG. 8 is a flowchart for a resource allocation method using a rearrangement counter according to a second exemplary embodiment of the present invention.

FIG. 8 shows a flowchart for a resource allocation method using a rearrangement counter according to a second exemplary embodiment of the present invention.

As shown in FIG. 8, the base station increases the rearrangement counter for each frame to which the resource is reallocated by the rearrangement information element S200. The base station includes the rearrangement counter generated by the base station S210 in the MAP, and transmits the same to the mobile station through the frame to which the resource is reallocated S220.

The mobile station determines whether the MAP transmitted by the base station includes a rearrangement counter S230, and uses the current resource S240 when the MAP does not include a rearrangement counter. However, when the MAP includes a rearrangement counter, the mobile station stores the rearrangement counter included in the MAP transmitted by the base station S230, and determines whether the newly stored rearrangement counter corresponds to the previously stored rearrangement counter S250.

When they correspond with each other, the resource can be used in the corresponding frame S250. The above-noted case represents the case in which the mobile station having stored the rearrangement counter receives a MAP when another mobile station requests to retransmit the MAP including a rearrangement counter, and in this case, the rearrangement counter included in the MAP is the same. That is, the MAP including a rearrangement counter is broadcast to a plurality of mobile stations, and hence, the mobile station can receive the MAP including the same rearrangement counter many times.

However, when the newly stored rearrangement counter does not correspond to the previously stored rearrangement counter and the MAP does not include a rearrangement information element, the mobile station receives the rearrangement information element from the base station, detects that an error is generated during receiving the MAP, and notifies the base station of a MAP received error S280. In this instance, the mobile station temporarily stops transmitting the circuit mode resource in the corresponding frame until receiving a rearrangement information element S270.

On receiving a MAP received error message from the mobile station, the base station reallocates the resource for the corresponding mobile station S290, and transmits the MAP including a rearrangement information element to the mobile station S300. In this instance, the rearrangement counter is not updated since the corresponding mobile station performs rearrangement on the resource performed in S200.

Here, the MAP received error is notified by transmitting one of the CQICH, HARQ feedback, and uplink burst to the base station. The HARQ ACK CH is used when transmitting the burst by using the HARQ mode, and the base station monitors the HARQ ACK CH used as a response to the downlink burst and determines failure of receiving a MAP when only detecting receiving an ACK/NACK.

In detail, in the case of using a HARQ feedback, the mobile station transmits a feedback including ACK/NACK information to the base station depending on whether the mobile station has finished receiving the MAP, and hence, the mobile station's receiving state on the rearrangement information element can be notified to the base station. In the case of using an uplink burst, when the mobile station has successfully received the MAP while the base station allocates the uplink resource to the mobile station through the rearrangement information element, the mobile station transmits information to the base station by using the uplink burst and checks the MAP receiving state. Also, in the case of using a CQICH, when the mobile station fails to receive the MAP since a specific codeword is defined in the CQICH, and it transmits the CQICH including a specific codeword to the base station, the base station detects that the mobile station did not receive the rearrangement information element.

In the case of using the CQICH, a codeword is identified for the uplink and the downlink in order to identify each codeword and transmit the same to the mobile station since the generated rearrangement information elements of the uplink and the downlink may not be the same.

Also, when failing to receive the CQICH or not using the CQICH, the mobile station can use a sub header or a MAC management message so as to notify the base station of difference of rearrangement counters. In this instance, the sub header or the MAC management message can include a rearrangement counter for each downlink and uplink.

When the mobile station notifies the base station of not receiving the rearrangement MAP, the base station broadcasts the rearrangement information element to the mobile station by using the MAP. Also, the base station can notify the rearrangement information element in the MAC PDU by allocating a dedicated burst to the corresponding mobile station.

On receiving the MAP from the base station, the mobile station determines whether the corresponding MAP includes a rearrangement information element S310, and uses the resource based on the corresponding information when the MAP includes a rearrangement information element S340. However, when the MAP includes no rearrangement information element, the mobile station can transmit a MAP received error to the base station S320, which can be repeated until a time out (MAX_RE_ARRANGE_TIMEOUT) for the rearrangement is generated or until rearrangement information is received.

That is, it is determined whether a time out for the rearrangement is generated S330, and the mobile station de-allocates the resource used by the mobile station when the time out is generated S340. However, when no time out for the rearrangement is generated, the steps after the step of determining whether the MAP transmitted by the base station includes a rearrangement information element of S310 are performed. Here, in the step of S320, the mobile station transmits the MAP received error to the base station by using various methods used in the step of S280.

The method for solving the receiving error by using a rearrangement counter when a MAP received errors occurs at the mobile station and using the rearranged resource has been described. Another method for solving the MAP received error, that is, a multiple information element method will now be described with reference to FIG. 9.

Figure 9:
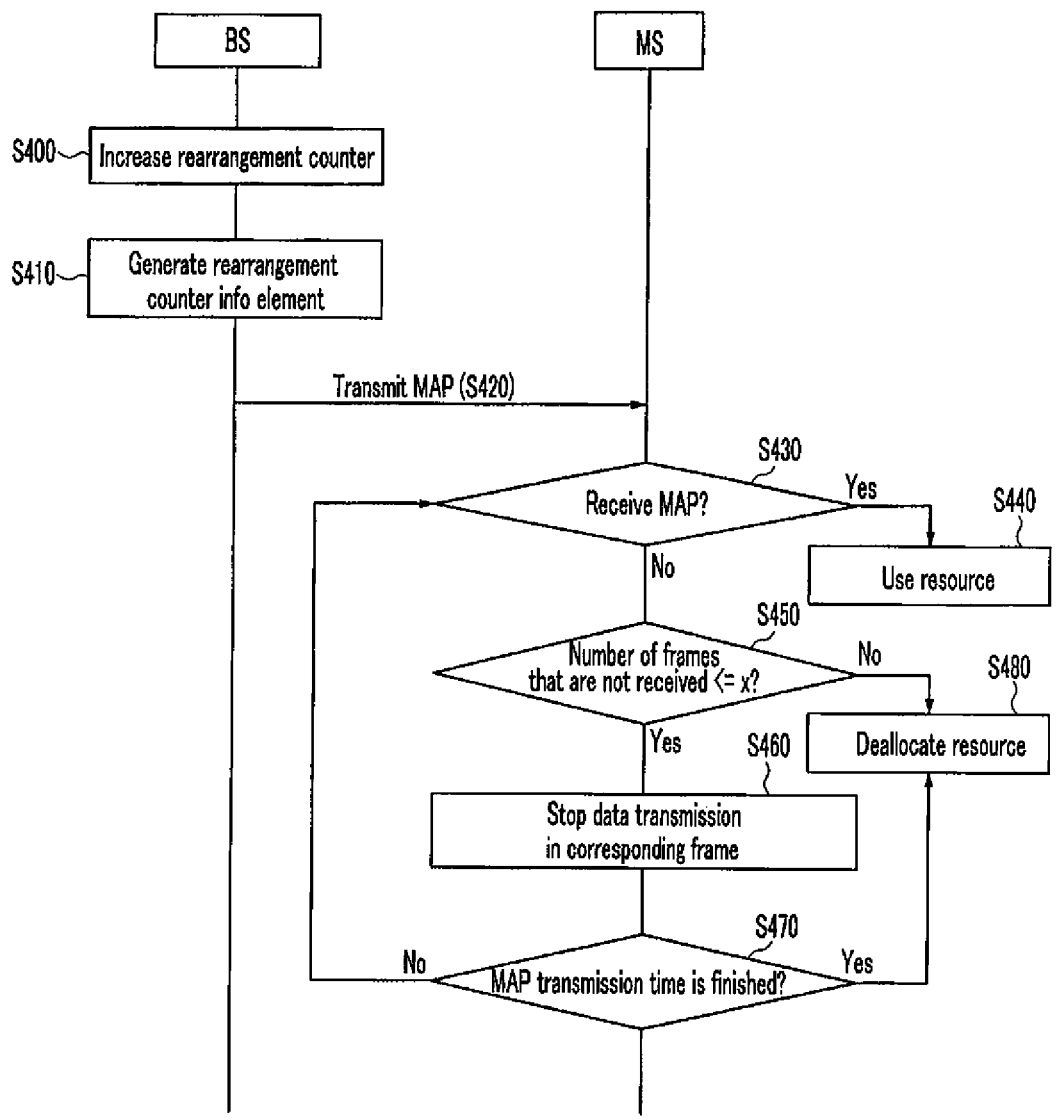
FIG. 9 is a flowchart for a resource allocation method using multiple information elements according to a second exemplary embodiment of the present invention.

FIG. 9 shows a flowchart for a resource allocation method using multiple information elements according to a second exemplary embodiment of the present invention.

The multiple information element transmission method repeatedly transmits a rearrangement information element including the same rearrangement counter to the mobile station through the MAP for a predetermined time. When the multiple information element transmission method is used, the mobile station having failed to receive the MAP for a time in which the same rearrangement information element is continuously broadcast de-allocates the resource automatically, or compares counter information in a like manner of the rearrangement counter method, reports the MAP received error to the base station, and receives allocation information again. FIG. 9 shows the case for de-allocating the circuit mode resource when continuously failing to receive the MAP according to an exemplary embodiment of the present invention.

As shown in FIG. 9, the base station increases the rearrangement counter for each frame to which the resource is reallocated according to the rearrangement information element S400. The rearrangement counter generated by the base station for a predetermined time S410 is included in the MAP and is transmitted to the mobile station through the frame to which the resource is reallocated S420. In this instance, the base station transmits the rearrangement information element to the mobile station over a plurality of frames for a predetermined time S420. That is, the base station transmits the MAP many times when there is no response to MAP receiving from the mobile station during the predefined MAP transmission time (MAX_REARRANGEMENT_TX).

The mobile station determines whether it has received the MAP from the base station S430. When failing to receive the MAP from the base station in the corresponding frame, the mobile station determines whether the number of frames in which the mobile station fails to receive the MAP is greater than a predetermined number (x) S450. When the number of frames is less than the predetermined number (x), the mobile station stops transmitting data in the corresponding frame S460. The mobile station determines whether the MAP transmission time (MAX_REARRANGEMENT_TX) is finished in step S470, and performs the steps after S430 when it is not finished.

However, when the mobile station continuously fails to receive the MAP for the period of many frames or when the MAP transmission time is finished, the mobile station de-allocates the circuit mode resource S480. In this instance, information on the number of frames for indicating transmission of rearrangement information elements over frames is broadcast to the mobile station through the downlink channel descriptor (DCD) that is a media access control layer message for describing a physical layer characteristic in the downlink or the uplink channel descriptor (UCD), which is a media access control message for describing a physical layer characteristic in the uplink, and the number of frames can be dynamically changed by using statistic values of the MAP received error of the mobile station.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiments of the present invention, the radio resource is efficiently used by eliminating a discontinuous unused region of the radio resource caused by resource de-allocation and resource change.

Also, the resource allocation mismatch that occurs when the mobile station fails to receive the MAP can be solved.

The invention claimed is:

1. A method for a base station to reallocate a resource comprising:
   generating rearrangement information including slot offset information of a discontinuous region of a fixed radio resource and slot shift information of the fixed radio resource to be rearranged;
   transmitting the rearrangement information to a mobile station; and
   shifting a slot of the fixed radio resource based on the slot offset information and the slot shift information to reallocate a resource to the mobile station,
   wherein the slot shift information includes the size of the discontinuous region, and
   wherein the slot offset information is information indicating a point where a discontinuous region of the fixed radio resource that is allocated before the radio resource to be rearranged is rearranged starts.

2. A method for a mobile station to receive a resource from a base station comprising:
   receiving a MAP including rearrangement information including a first slot offset for indicating information on a start point of a fixed radio resource after a discontinuous region of the fixed radio resource;
   comparing the first slot offset and a second slot offset that corresponds to a slot offset of the resource that is currently in use; and
   receiving and using a new fixed radio resource or using the resource that is currently in use depending on the comparison result,
   wherein the using further includes using the fixed radio resource that is shifted by the slot shift information when the first slot offset is less than or equal to the second slot offset.

3. The method of claim 2, wherein the rearrangement information further includes slot shift information of the fixed radio resource to be rearranged.

4. The method of claim 2, wherein the using further includes using the resource that is currently in use when the first slot offset is greater than the second slot offset.

5. A method for a base station to reallocate a resource comprising:
   generating rearrangement information including information on a fixed radio resource to be rearranged;
   increasing a rearrangement counter when the rearrangement information is generated;
   transmitting a MAP including a rearrangement counter information including the rearrangement counter; and
   after transmitting the MAP, when receiving a message for notifying failure of receiving the MAP from the mobile station, retransmitting a MAP including rearrangement information including information on the fixed radio resource to be rearranged to a mobile station.

6. A method for a mobile station to receive a resource from a base station comprising:
   receiving a MAP including rearrangement counter information from the base station;
   transmitting a message for notifying failure of receiving the MAP to the base station when failing to receive the MAP;
   receiving a MAP including the rearrangement counter information including information which is retransmitted from the base station after transmitting the message for notifying failure of receiving the MAP to the base station; and
   receiving a new fixed radio resource based on a rearrangement counter value included in the rearrangement counter information,
   wherein, the rearrangement counter value is increased by 1 when a rearrangement of the new fixed radio resource occurs.

7. The method of claim 6, wherein the receiving of the new fixed radio resource includes:
   receiving a MAP from the base station, and determining whether the MAP includes rearrangement information for allocating the new fixed radio resource; and
   receiving the new fixed radio resource based on the rearrangement information when the MAP includes the rearrangement information.

8. The method of claim 7, wherein the MAP received error message is transmitted to the base station by using one of a channel quality indicator channel (CQICH), a hybrid automatic repeat request (HARQ) feedback, and an uplink burst.

9. The method of claim 6, further comprising:
   using the resource that is currently in use when the MAP does not include the rearrangement counter information.

10. A method for a mobile station to reallocate a resource, the method comprising:
    receiving, from a base station, rearrangement information including slot offset information of a discontinuous region of a fixed radio resource and slot shift information of the fixed radio resource to be rearranged; and
    shifting a slot of the fixed radio resource based on the slot offset information and the slot shift information to reallocate a resource,
    wherein the slot shift information includes the size of the discontinuous region, and
    wherein the slot offset information is information indicating a point where a discontinuous region of the fixed radio resource that is allocated before the radio resource to be rearranged is rearranged starts.

* * * * *